US007558013B2

(12) United States Patent
Jeansonne et al.

(10) Patent No.: US 7,558,013 B2
(45) Date of Patent: Jul. 7, 2009

(54) PROGRAMMING A SENSITIVITY LEVEL INTO AN INERTIAL SENSOR BASED ON A PROXY OF WHETHER A SYSTEM IS IN TRANSIT

(75) Inventors: Jeffrey K. Jeansonne, Houston, TX (US); Steven S. Homer, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

(21) Appl. No.: 11/330,585

(22) Filed: Jan. 12, 2006

(65) Prior Publication Data

US 2007/0162238 A1 Jul. 12, 2007

(51) Int. Cl.
*G11B 15/04* (2006.01)
(52) U.S. Cl. .......................................... 360/60; 360/75
(58) Field of Classification Search ........................ None
See application file for complete search history.

(56) References Cited

U.S. PATENT DOCUMENTS

| 6,553,807 | B2 | 4/2003 | Luk et al. | |
|---|---|---|---|---|
| 6,580,574 | B1 * | 6/2003 | Codilian | 360/60 |
| 7,212,360 | B2 * | 5/2007 | Nagai et al. | 360/6 |
| 2002/0035865 | A1 | 3/2002 | Luk et al. | |
| 2004/0125493 | A1 | 7/2004 | Shimotono et al. | |
| 2005/0057834 | A1 | 3/2005 | Hirano et al. | |
| 2005/0073764 | A1 | 4/2005 | Ogawa et al. | |
| 2005/0099719 | A1 * | 5/2005 | Katai et al. | 360/75 |
| 2005/0141127 | A1 | 6/2005 | Shimotono et al. | |
| 2005/0278557 | A1 | 12/2005 | Asoh et al. | |

OTHER PUBLICATIONS

"Hard drive Active Protection: How to test the accelerometer to ensure it is working properly—ThinkPad General," Copyright 2005 IBM Corporation, 1 pp. [Online] http://www-307.ibm.com/pc/support/site.wss/document.do?Indocid=MIGR-53248.
K. Taylor, "IBM gives laptop hard drives a soft landing," PC Magazine, Oct. 7, 2003, 3 pp. [Online] http://www.pcw.co.uk/pc-magazine/news/2133264/ibm-gives-laptop-hard-drives-soft-landing.
"IBM ThinkPad Accelerometer, aka Active Protection System," Nov. 2003, Analog Devices Inc., 1 pp. [Online] http://www.paul.sladen.org/thinkpad-r31/accelerometer.html.
"Hard drive Active Protection System overview—ThinkPad General," Copyright 2005 IBM Corporation, Copyright Lenovo 2005, 3 pp. [Online] http://www-307.ibm.com/pc/support/site.wss/document.do?sitestyle=lenovo&Indocid=MIGR-54259.
International Search Report and Written Opinion for PCT/US2006/047283 dated Jul. 19, 2007; 11 pages.

* cited by examiner

*Primary Examiner*—Jason C Olson

(57) ABSTRACT

A system comprises a sensor and logic coupled to the sensor. The logic programs a sensitivity level into the sensor to a first sensitivity level if a proxy indicates that the system is in transit and to a second sensitivity level if proxy indicates that the system is not in transit.

18 Claims, 2 Drawing Sheets

PROGRAMMING A SENSITIVITY LEVEL INTO AN INERTIAL SENSOR BASED ON A PROXY OF WHETHER A SYSTEM IS IN TRANSIT

BACKGROUND

A portable electronic system, such as a laptop computer, typically comprises a storage device such as a hard disk drive. Such storage devices typically have a rotating storage medium and one or more read or write heads positioned in close proximity to the surface of the storage medium. If the system were to be accidentally dropped, one or more of the heads could contact the storage medium upon impact of the electronic system with the ground. As a result of the contact between the head(s) and the storage medium, the storage device could be permanently damaged. rendering it unusable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
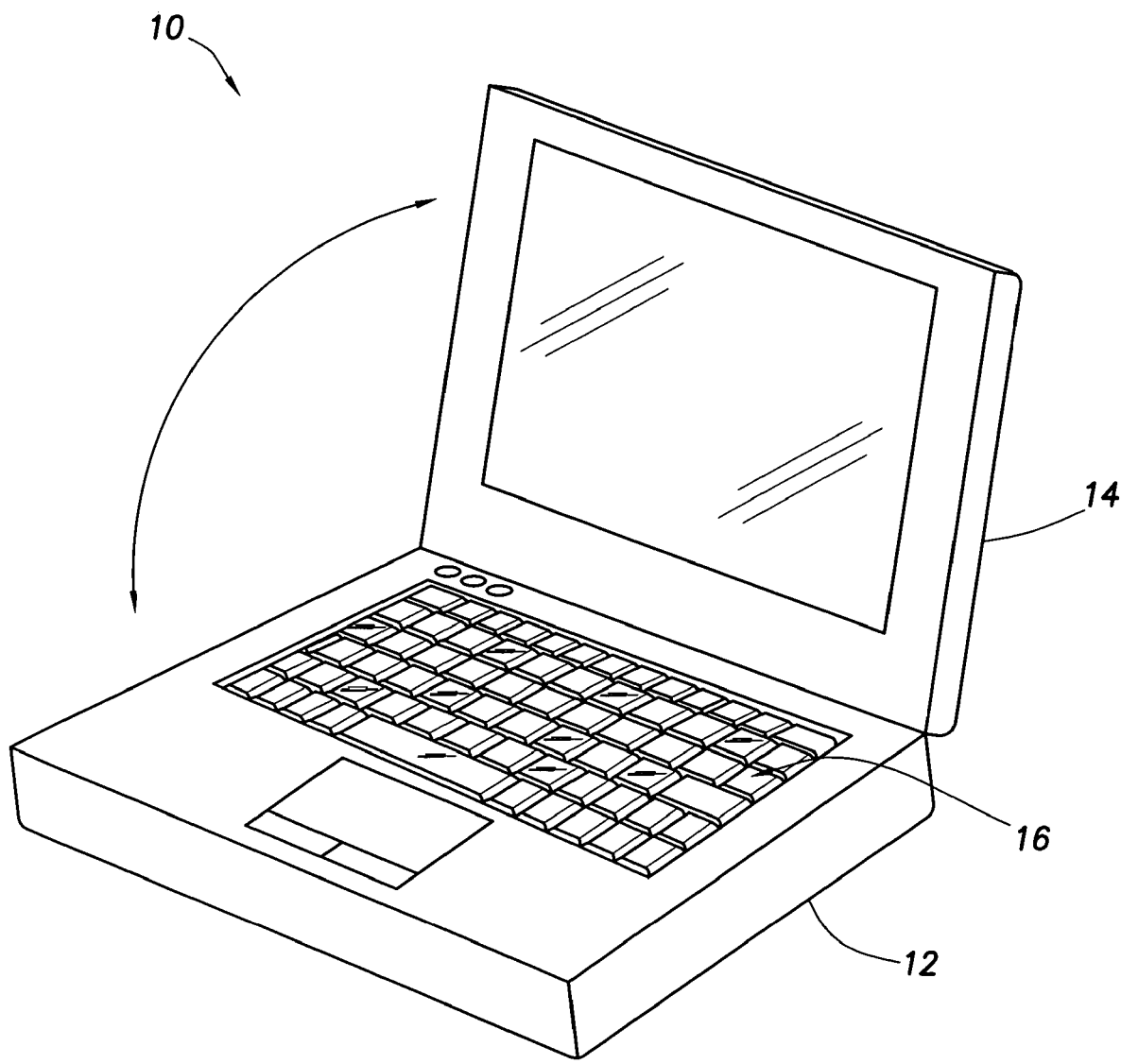
FIG. 1 shows a computer system with a display in accordance with embodiments of the invention.

FIG. 1 shows an electronic system 10 in accordance with embodiments of the invention. System 10 comprises a portable electronic device such as a laptop computer. Other embodiments of the invention comprise devices other than laptop computers. As shown, system 10 comprises a base unit 12 to which a hinged display 14 is attached. The hinged display can be in one of a plurality of open positions (as shown in FIG. 1) or in a closed position. The base unit 12 comprises an input device 16 such as a keyboard.

In accordance with embodiments of the invention, system 10 includes or couples to a "drop" sensor such as an inertial sensor or accelerometer. Such a sensor reacts to movement of system 10 such as might be the case if the system 10 were dropped. The system 10 also comprises a device that can be damaged if the system were to be dropped or otherwise knocked and that can be transitioned to a protected mode to reduce or eliminate the possibility of damage if the drop sensor detects a threshold movement of the system 10. In at least one embodiment described herein, the device comprises a rotating storage device such as a hard disk drive. The rotating storage device comprises a rotating medium and one or more read or write heads in close proximity to the rotating medium to read data from or write data to the rotating medium. The system 10 comprises logic that, based on a signal from the drop sensor, detects when the system 10 is, for example, falling which, in turn, is indicative of an imminent contact of the system 10 with a surface (i.e., the ground). Once the aforementioned logic detects that the system 10 is falling, the logic responds by causing the rotating storage device to transition to a protected mode to reduce or eliminate the possibility of damaging the rotating storage device and/or head upon impact of the system with the surface. In one embodiment, the protected mode comprises causing the read and/or write head to be moved away from the rotating disk. This protected mode may be referred to as "parking" the head. The head may comprise a read head, a write head, and/or a combination of read and write heads.

Figure 2:
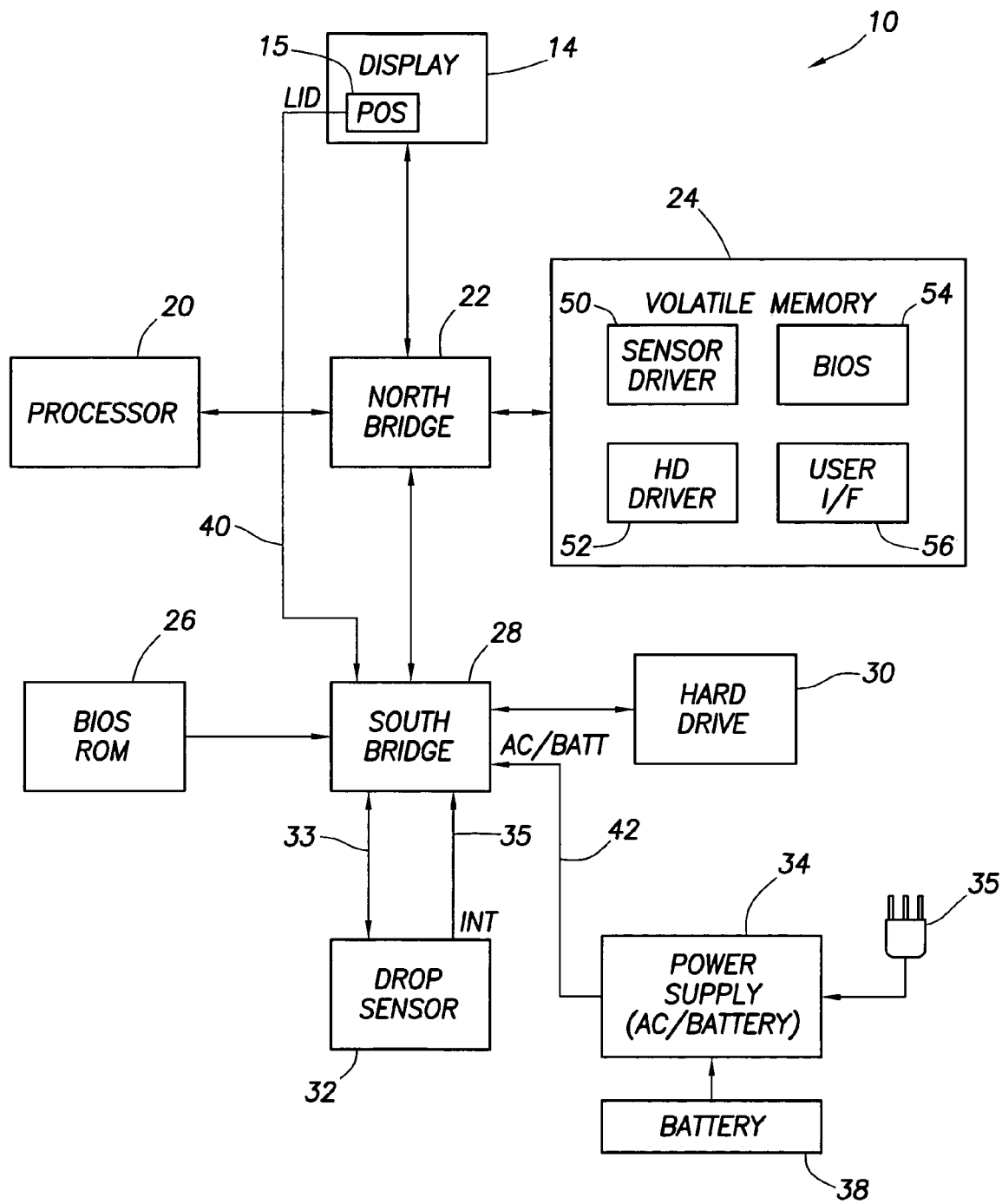
FIG. 2 shows a block diagram of the computer system of FIG. 1 in accordance with embodiments of the invention.

Referring to FIG. 2, system 10 comprises the display 14, as well as a processor 20, a north bridge 22, volatile memory 24, a basic input output system (BIOS) read-only memory (ROM) 26, a south bridge 28, a hard drive 30, a drop sensor 32, and a power supply 34. The north bridge 22 couples together the processor 20, the display 14, the volatile memory 24, and the south bridge 28. The south bridge 28, in turn, couples together the BIOS ROM 26, the hard drive 30, the accelerometer 32 and the power supply 34. The display 14 includes a position sensor 15 which provides a LID signal 40 to the south bridge 28. The LID signal indicates whether the display 14 is in an open or closed state. For example, a LID signal state of "0" may indicate that the display is open, while a LID signal state "1" may indicate that the display is closed.

A hard drive 30 is shown in FIG. 2. However, in other embodiments, other types of devices can be included that are susceptible to being damaged from the system being dropped or knocked and transitionable to a protected mode. An example of such a device includes a compact disc read-only memory (CD ROM) drive as well as devices other than storage devices. In general, the embodiments of the present invention comprise logic that reacts to a detection that the system is falling and/or being knocked to protect a device that otherwise could be damaged.

The volatile memory 24 may comprise random access memory (RAM). Memory 24 generally represents the main system memory of system 10. As shown in FIG. 2, volatile memory 24 stores a plurality of processor-executed software components 50-56. Software component 50 comprises a drop sensor driver. Software component 52 comprises a hard disk driver. Software component 54 comprises BIOS code. Software component 56 comprises a user interface. Software components 50, 52 and 56 are stored on hard drive 30 and copied to volatile memory 24 for execution by processor 20. The BIOS ROM 26 comprises the BIOS code that is stored in BIOS ROM 26, executed during boot-up of the system 10, and subsequently copied to volatile memory 24 for use by the operating system and other software running on system 10 for interaction with various low level functions of the computer.

The architecture depicted in FIG. 2 is exemplary of one embodiment of the invention. Other architectures are possible as well and are within the scope of this disclosure.

The power supply 34 receives alternating current (AC) power via plug 35 and may include, or be coupled to, one or more batteries 38. Direct current (DC) power derived either from the AC power source or a battery is used to power the various electronic components within system 10. The power supply 34 asserts an AC/BATT signal 42 to the south bridge 28. The AC/BATT signal 42 indicates whether the system 10 is presently operating from AC power or battery power. In at least one embodiment, the AC/BATT signal is a logic high when the system is operating from AC power and a logic low when the system is operating from battery power.

The south bridge 28 thus receives the LID signal 40 indicating whether the display 14 is open or closed and the AC/BATT signal 42 indicating whether the system is operating from AC or DC power. That information may be stored in one or more registers within the south bridge 28 and accessible to processor 20 during execution of software such as the sensor driver 52. Accordingly, sensor driver 52 can determine whether the display is open or closed and whether the system is operating from battery or AC power.

In some embodiments, the output signal 35 is asserted by the sensor 32 when the sensor detects movement in excess of a threshold condition. Further, the drop sensor 32 has a sensitivity level that is programmable. The sensitivity level of the sensor refers to the reaction of the sensor to generate the output signal, which in FIG. 2 comprises the interrupt signal 35, in response to a detected movement. If the sensitivity level of the sensor 32 is programmed at a relatively high level, the sensor will readily assert the interrupt signal 35 upon a relatively minor physical disturbance of the system. For example, a slight knock of the system on a table top might cause the sensor to assert the interrupt signal. On the other hand, if the sensitivity level is programmed at a relatively low level, a slight knock of the system 10 will not trigger the interrupt. Instead, a prolonged free-fall event will cause the interrupt to be triggered. In some embodiments, the sensitivity level can be set at any of a plurality of levels.

The sensitivity level for the sensor 32 is programmed based on a proxy for whether the system is in transit. In some embodiments, the proxy comprises two pieces of information—the status of the display as being open or closed and the system's power source as either AC or battery power. A proxy for determining that the system is in transit is that the display is closed and the system is operating from battery power. For example, the user may unplug the system 10 from an AC source, close the display 14, and carry the system 10 to a meeting. In other embodiments, the proxy for determining that the system is in transit is that the system is operating from battery power regardless of the open/closed state of the display. A proxy for determining that the system is not in transit comprises the system operating from AC power which indicates that the system is likely sitting on a table top or other location in which the system is not likely to be dropped. In this latter scenario (proxy for the system not being in transit), the display may be open or closed. An open display may mean that a user is using the display. The display being closed, yet the system operating from AC power, indicates that system may be mated, for example, with a docking station and thus also not likely to be susceptible being dropped. Other proxies for the transit and stationary conditions are possible as well.

The sensor driver 50 detects, or otherwise is informed of the assertion of interrupt signal 35 from sensor 32. The sensor driver 50 periodically (e.g., once per second) ascertains the state of the LID and AC/BATT signals 40 and 42, respectively, to determine the proxy condition. In other embodiments, the sensor driver 50 reads a register internal to south bridge 28 that contains the information reflected by the signals 40 and 42. If the proxy condition indicates that the system is in transit, the sensor driver 50 programs the sensitivity level at a first sensitivity level. If, however, the proxy condition indicates that the system is not in transit, the sensor driver 50 programs the sensitivity level at a second sensitivity level. In at least some embodiments, the first sensitivity level is higher than the second sensitivity level. With the sensitivity level set higher when the proxy condition is indicative of the system 10 being in transit than otherwise, the system 10 is more likely to react to physical disturbances and cause the hard drive 30 to transition to a protected mode. Such reactions may occur needlessly (e.g., in situations in which the system is not actually being dropped), but as the system presumably is not being used anyway (as indicated by the display being closed and the system operating from battery power), a false positive in which, for example, a head on the hard drive is needlessly parked is not a concern.

With the sensitivity level set lower (when the system 10 is not likely to be in transit) than the higher sensitivity level noted in the preceding paragraph (when the system is likely to be in transit), the system is less likely to react to physical disturbances that would have caused the sensor programmed with the higher sensitivity level to cause the hard drive to transition to the protected mode. As such, the system's drop sensor-based protection response is less likely to react to protect the hard drive 30 from lesser magnitude drops or knocks when not in transit than compared to drops or knocks when the system is in transit. The system is thus able to reduce the potential for needlessly parking of the hard drive's heads when the system is being used by a user. As such, the system 10 comprises logic that balances the competing concerns of, on one hand, adequately protecting the hard drive (e.g., from damage resulting from the system being dropped) and, on the other hand, not causing the hard drive to transition needlessly to a protected mode (e.g., when not actually being dropped).

In some embodiments the sensor 32 comprises a 3-axis, digital output linear accelerometer that includes a sensing element and a digital interface capable of taking information from the internal accelerometer sensing element and providing accelerometer data to logic external to the accelerometer through bus 33. In at least some embodiments, accelerometer 32 comprises an inertial sensor such as the LIS3LV02DQ MEMS interial sensor from STMicroelectronics. As shown in FIG. 2, bus 33 couples the accelerometer 32 to south bridge 28. Thus, via south bridge 28 the system is able to read the acceleration information from the sensor 32. The sensor 32 is also programmable, via south bridge 28, in that one or more thresholds can be programmed into the sensor. In the embodiments in which the sensor comprises an inertial sensor or accelerometer, the programmable threshold comprises a value of gravity. As such, once the sensor detects a motion condition (e.g., a gravity condition) below the programmed threshold, the sensor 32 can be programmed to assert the interrupt signal 35 indicating, for example, a possible free fall condition. Setting the sensitivity level of the sensor comprises programming the sensor with the desired threshold values. For those embodiments in which the sensor comprises a three-axis accelerometer, the threshold programmed into such accelerometer corresponds to the vector sum of the three-axes of acceleration data. That is, if the vector sum of the x, y, and z axes of acceleration data is below the programmed threshold, the accelerometer asserts the interrupt signal 35.

In other embodiments, the sensor 32 provides drop condition data via bus 33 to logic external to the sensor such the south bridge 28, sensor driver 50, and processor 20. Such data may comprise the gravitational state of the drop sensor 32. The external logic compares the drop condition data to the aforementioned thresholds to determine the onset of a free-fall or excessive knock condition. In such an embodiment, the sensor 32 itself may not be programmable and thus may not generate the interrupt signal upon detection of the free-fall or excessive knock condition. Instead, logic external to the sensor performs such actions. In such embodiments, the sensor driver 50 periodically reads the drop condition data from the sensor. The period for such a sensor read operation may be a suitable time period to enable sufficiently rapid detection of, and reaction to, a fall/knock condition. In one embodiment, the period may be twice per second, although other periodicities are possible as well.

Instead of a bus 33, the sensor 32 may have a digital interface to the external logic (e.g., south bridge 28). In yet other embodiments, the sensor 32 may provide raw analog sensor signal(s) to the external logic instead of communicating digital data over a bus.

The embodiments of the invention take into the account the competing concerns of avoiding false triggers that needlessly cause the heads to be parked and parking the heads when appropriate by increasing the sensitivity of the drop sensor-based protection scheme when it is determined that the system 10 may be in transit and thus susceptible to being dropped and decreasing the sensitivity of the accelerometer-based response when it is determined that the system 10 may not be in transit. In one embodiment, determining that the display 14 is in a closed state and the system is operating from battery power represents an indication that the system 10 may be in transit. On the other hand, determining that the display 14 is in an open position and that the system is operating from AC power indicates that the system is being used in a fixed location such as on a desk and plugged into an AC outlet or docking station and thus is not in transit. Accordingly, logic in the system 10 differentiates these two conditions and programs the sensor 32 with two different levels of sensitivity accordingly. Such logic includes at least the sensor driver 50 and processor 20 that executes driver 50.

Once the sensitivity level is programmed into the sensor 32, the sensor asserts the interrupt signal 35 when the sensor experiences a low gravity condition in violation of a threshold in the embodiments in which the drop sensor is sensitive to gravitational changes. The interrupt signal 35 is received by the south bridge 28. In response to the assertion of the interrupt signal 35, the hard drive driver 52 reacts by causing the hard drive 30 to transition to a protected mode (e.g., parking a head) and by precluding any accesses (reads or writes) to the hard drive from reaching the hard drive. In some embodiments, the hard drive accesses are temporarily blocked by the hard drive driver 52 but then permitted to proceed by the driver 52 once the condition causing violation of the sensor's threshold has passed. That is, once the sensor is no longer experiencing the gravity condition that caused the interrupt signal to be asserted, the interrupt signal is deasserted by the sensor and the hard drive driver 52 causes the hard drive 30 to transition out of the protected mode. (e.g., unpark the head) and permit any pending hard drive accesses to proceed. A protected mode may comprise any suitable protection mechanism including parking a head or other mechanism as desired.

A time delay may be imposed following cessation of the condition that caused the sensor to assert the interrupt signal before the hard drive driver 52 permits the hard drive to transition out of its protected mode and to permit pending accesses to proceed. The time delay may be fixed (e.g., encoded as part of the driver 52) or programmable and may differ depending on the programmed sensitivity level. For instance, the time delay may depend on whether the proxy indicated that system 10 was in transit or stationary at the time of the potential drop. In some embodiments, the time delay may be longer if the proxy had indicated that the system was in transit when the sensor detected the potential free-fall condition compared to the system being stationary.

In some embodiments, the amount of time that the system has been deemed to be in transit is taken into account for setting the sensitivity level associated with the drop sensor 32. For example, a fixed or programmable amount of time may be specified following the beginning of an "in transit" situation after which the sensitivity level is automatically returned to its pre-"in transit" level. It might be assumed that the system has reached its destination after, for example, 30 minutes and thus, regardless of the indication provided by the proxy, the sensitivity level of the drop sensor may revert back to the pre-in transit level.

The above discussion is meant to be illustrative of the principles and various embodiments of the present invention. Numerous variations and modifications will become apparent to those skilled in the art once the above disclosure is fully appreciated. For example, the logic that adjusts the sensitivity associated with the drop sensor and logic that reacts to a detected free fall condition may be implemented in software, hardware, or a combination of hardware and software. It is intended that the following claims be interpreted to embrace all such variations and modifications.

What is claimed is:

1. A system, comprising:
    a sensor;
    a display; and
    logic coupled to sensor and said display, said logic programs a sensitivity level into the sensor to a first sensitivity level if a proxy indicates that the system is likely in transit and to a second sensitivity level if proxy indicates that the system is likely not in transit;
    wherein the proxy indicating that the system is likely in transit comprises a first signal indicative of the display being closed and a second signal indicative of the system operating from battery power.

2. The system of claim 1 wherein the first sensitivity level is higher than the second sensitivity level.

3. The system of claim 1 wherein the proxy indicating that the system is not in transit comprises a signal indicative of the system operating from alternating current (AC) power.

4. The system of claim 1 wherein the sensor is programmed with thresholds that correspond to the first and second sensitivity levels.

5. The system of claim 1 further comprising a device that is caused to be transitioned to a protected mode if a signal from the sensor is in violation of a threshold.

6. The system of claim 5 wherein the protected mode comprises said logic precluding access to said device.

7. The system of claim 6 wherein said logic permits access to said device following a time delay after the sensor no longer indicates that the threshold is being violated.

8. The system of claim 7 wherein the size of the time delay depends on whether the first sensitivity level or second sensitivity level had been programmed into the sensor.

9. The system of claim 1 wherein the sensor comprises a sensor selected from a group consisting of an inertial sensor, an accelerometer and a motion sensor.

10. A system, comprising:
    a position sensor adapted to couple to a closeable display, said position sensor causing a sensor signal to be produced to indicate whether the display is open or closed;
    a drop sensor that produces drop data indicative of at least one of a gravitational and motion state of the system; and
    logic that is programmed with a threshold associated with said drop sensor based on whether the position sensor signal indicates that the display is open and based on a determination of a type of power from which the system is operating, said type of power comprising battery power or AC power.

11. The system of claim 10 wherein said logic is part of the drop sensor.

12. The system of claim 10 wherein said drop sensor comprises a sensor selected from a group consisting of an inertial sensor, an accelerometer and a motion sensor.

13. The system of claim 10 further comprising a rotating storage medium and said logic causes said rotating storage medium to transition to a protected mode if said logic receives drop data from said drop sensor indicating that the system is likely experiencing a gravitational or motion condition that is in violation of said programmed threshold.

14. The system of claim 10 wherein said threshold comprises a first threshold if the position sensor signal indicates that the display is open and a second threshold if the position sensor signal indicates that the display is closed, wherein the first threshold is different from the second threshold.

15. A method, comprising:
determining whether a computer display is open or closed;
determining whether a computer including the computer display is operating from battery power or AC power; and
programming a sensitivity level associated with a drop sensor associated with a computer based on whether the computer display is open or closed and based on the whether the computer is operating from battery power or AC power.

16. The method of claim 15 further comprising receiving a signal from said drop sensor indicating that the drop sensor has experienced a gravitational or motion condition in violation of the programmed threshold.

17. The method of claim 16 further comprising, based on the signal, transitioning a device to a protected mode.

18. The method of claim 16 further comprising, based on the signal, moving a head of storage device to a position so as to preclude the head from impacting a storage medium.

* * * * *